United States Patent [19]

Naidu et al.

[11] Patent Number: 6,128,470

[45] Date of Patent: *Oct. 3, 2000

[54] SYSTEM AND METHOD FOR REDUCING CUMULATIVE NOISE IN A DISTRIBUTED ANTENNA NETWORK

[75] Inventors: Arun Naidu, Raleigh; Jacque Huffman, Cary; Larry Eckstein, Apex, all of N.C.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 00 days.

[21] Appl. No.: 08/683,187

[22] Filed: Jul. 18, 1996

[51] Int. Cl.$^7$ ...................................................... H04N 7/155

[52] U.S. Cl. ................................ 455/16; 455/422; 455/14

[58] Field of Search ...................................... 455/422, 33.1, 455/33.2, 33.3, 33.4, 54.1, 56.1, 52.1, 50.1, 10, 14, 15, 16, 17, 18, 19; 379/58, 59, 60

[56] References Cited

U.S. PATENT DOCUMENTS

| | | | |
|---|---|---|---|
| 4,893,349 | 1/1990 | Eastmond et al. | 455/52.1 |
| 5,321,514 | 6/1994 | Martinez | 455/33.2 |
| 5,432,838 | 7/1995 | Purchase et al. | 379/60 |
| 5,533,011 | 7/1996 | Dean et al. | 455/52.3 |
| 5,634,191 | 5/1997 | Beasley | 455/14 |
| 5,644,622 | 7/1997 | Russell et al. | 455/422 |
| 5,678,177 | 10/1997 | Beasley | 455/33.1 |
| 5,781,859 | 7/1998 | Beasley | 455/15 |
| 5,812,933 | 9/1998 | Niki | 455/16 |

OTHER PUBLICATIONS

A. Morris, "Cable in PCS: Pioneering Telephony's Future Technology," *Communications Technology,* pp. 42, 45, and 47–49, Dec. 1994.

H.E. Young, "PCS Over Cable—An Opportunity for Some CATV Companies," *Telephony,* pp. 70–72, Jan. 30, 1995.

C.A. Eldering et al., "CATV Return Path Characterization for Reliable Communications," *IEEE Communications Magazine,* pp. 62–69, Aug. 1995.

*Primary Examiner*—Andy Rao
*Attorney, Agent, or Firm*—Burns, Doane, Swecker & Mathis, L.L.P.

[57] ABSTRACT

A communications system and method are provided for reducing noise in a distributed antenna network. The system includes a plurality of remote antenna units with each remote antenna unit including a receiver for receiving input signals, a signal strength processor for determining whether a valid signal is present at its respective remote antenna unit and an output controller for switching off the network connection when no valid signal is present. As a result, the cumulative noise generated by uplink stages connected to the remote antenna units is reduced by switching off the network connection of remote antennas that are do not have to be connected. The communications system and method may further include an output controller for controlling the output for its respective remote antenna unit based on the comparison by the signal strength processor. The output controller may control the network connection of the remote antennas by switching off their connection to the network when the signal strength processor determines that the signal strength level is below a noise threshold level. The output controller may control the output of the remote antenna units by switching off their connection to the network when the signal strength processor determines that the signal strength level is below a noise threshold level and by switching on the connection to the network when the input signal strength level is greater than or equal to the noise threshold level.

18 Claims, 5 Drawing Sheets

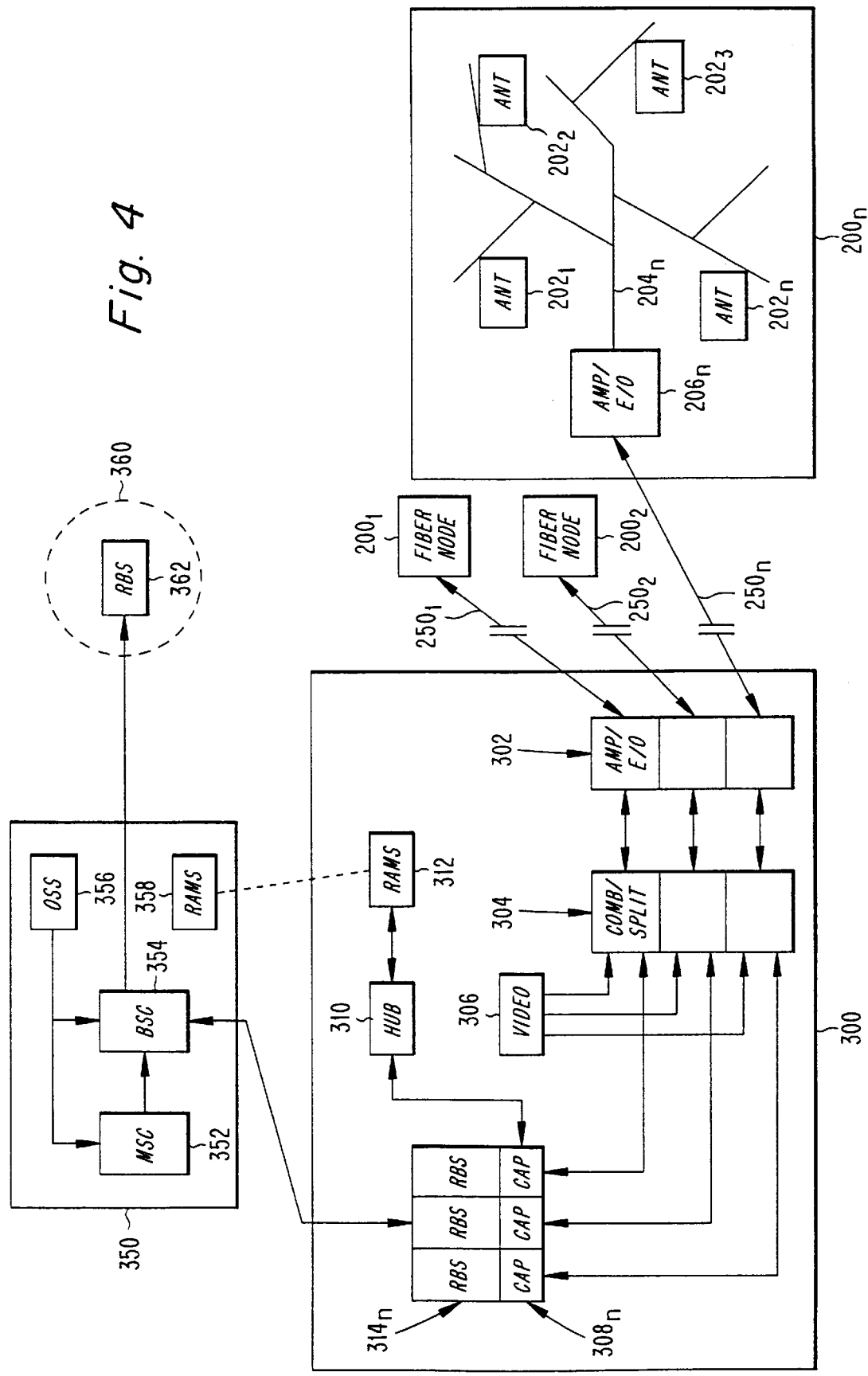

SYSTEM AND METHOD FOR REDUCING CUMULATIVE NOISE IN A DISTRIBUTED ANTENNA NETWORK

BACKGROUND

The present invention is directed to a system and method for reducing the cumulative noise resulting from the uplink stages connected to a plurality of remote antenna units in a distributed antenna network. More particularly, the present invention reduces the cumulative noise by utilizing a signal strength processor.

As personal communications services (PCS) evolve as the next generation of cellular telephone technology, systems and techniques for simply and efficiently transmitting and receiving communication signals are being investigated. One known system is a distributed antenna network (which is also referred to as a multicast network) which provides coverage over substantial areas by a plurality of remote antenna units. An example of a distributed antenna network is illustrated in FIG. 1 where an individual transceiver unit 10 is connected to a plurality of cells $20_1, \ldots 20_n$ by transmission media 30 which transports radio signals between the transceiver unit 10 and the cells $20_1, \ldots 20_n$. Each of the cells $20_1, \ldots 20_n$ include remote antenna units $21_1, \ldots 21_n$. The remote active antenna units $21_1, \ldots 21_n$ may be connected to the transmission media 30 by frequency converting circuitry $22_1, \ldots 22_n$ for certain applications.

Various infrastructures are being developed and modifications of existing infrastructures are of great interest as an alternative for PCS because they are fully capable of providing high quality signals at lower costs than traditional cellular infrastructures. For example, CATV infrastructures have been modified for use in PCS. Such modifications include the CATV infrastructures using a hybrid fiber/coax (HFC) cable infrastructure to increase capacity and improve service quality. Although it is theoretically possible for any CATV infrastructure to support PCS with the proper modifications, the HFC cable infrastructure offers an attractive option as an economical alternative to wireless providers seeking to avoid the high cost of network construction.

FIG. 2 illustrates the basic components of a CATV infrastructure used to support PCS. In FIG. 2, base station equipments $50_1$ and $50_2$ are connected to a public network, such as a public switched telephone network. Remote antenna signal processors (RASPs) $52_1$ and $52_2$ connect the base station equipments $50_1$ and $50_2$ to a fiber equipment 54. The fiber equipment 54 is connected to a fiber node 58 by fiber optic cable 56 and the fiber node 58 is connected to remote antenna driver (RAD) nodes $62_1$ and $62_2$ by two-way coaxial cable 60. The RAD nodes $62_1$ and $62_2$ each include a group of RADs $64_1$ and $64_2$ and $66_1$ and $66_2$ respectively connected to antennas $68_1$, $68_2$, $70_1$, and $70_2$. This CATV infrastructure converts radio frequency signals into CATV frequency signals usable in the existing CATV infrastructure and converts the CATV frequency signals back into radio frequency signals for broadcast. More specifically, the RASPs $52_1$ and $52_2$ convert the radio frequency signals from the base station equipments $50_1$ and $50_2$ and then send the converted signals in the downlink path toward the appropriate fiber node 58 and onto the coaxial cable 60.

The RADs $64_1$, $64_2$, $66_1$, and $66_2$ are connected to the coaxial cable 60 for converting CATV frequency signals into assigned radio frequency signals. Radio frequency signals may be received by the RADs $64_1$, $64_2$, $66_1$, and $66_2$ which convert these signals into signals of frequencies suitable for transmission in the uplink path of the CATV infrastructure. Thereafter, the RASPs $52_1$ and $52_2$ convert the upstream CATV frequency signals back into radio frequency signals for processing by the base station equipments $50_1$ and $50_2$. This CATV infrastructure may also accommodate equipment for multiple modulation schemes, such as time division multiple access (TDMA), code division multiple access (CDMA), and frequency division multiple access (FDMA).

Radio telephony systems may utilize this CATV infrastructure by operating on available portions of the radio frequency spectrum over fiber optic and coaxial cables, which are widely available in urban areas, so that such systems may be installed to take advantage of this existing infrastructure. The large installed base of fiber optic and coaxial cables used by CATV operators may thereby be effectively exploited at a minimal cost by this infrastructure which distributes the signals to the appropriate antenna locations.

The antenna network used in CATV infrastructures is commonly termed a distributed antenna network or multicast network because coaxial or heliaxial cable is used to feed a plurality of antennas distributed within a coverage area. The use of multiple antennas effectively increases and controls the size of the coverage area. When used in a two-way communication system, a distributed antenna network suffers from some problems. Low power urban cellular base stations and low power PCS handsets of limited range may introduce noise to the network which limits the coverage area by the network.

Also, each remote antenna contributes noise that is relatively more important in the uplink. These noise problems significantly increase as the number of remote antennas in the-distributed antenna network increases. The cumulative noise is the sum of the individual noise contributions of the remote antennas. Thus, having numerous remote antennas can severely degrade the performance of a communication system in which the signal-to-noise ratio is a critical parameter.

As existing CATV networks continue to be modified for use in telephony communication, it is desirable to reduce noise generated in distributed antenna networks so that a system using many remote antennas is useful for telephony communication over large coverage areas.

SUMMARY

It is, therefore, one object of the present invention is to provide a system and method for reducing the cumulative noise generated by uplink stages connected to a plurality of remote antenna units in a distributed antenna network.

Another object of the present invention is to provide a system and method for determining whether or not a valid signal is present at each remote antenna in a distributed antenna network and switching off the network connection to each remote antenna when no valid signal is present. Accordingly, the cumulative noise of the network is reduced without adversely affecting the communication performance of the system.

A further object of the present invention is to provide a system and method for detecting the signal strength level at each remote antenna in a distributed antenna network and comparing this detected level to a noise threshold level. When this comparison determines that the detected signal level is below the noise threshold level at any of the remote antennas, the network connection for those remote antennas are switched off so that unnecessary noise is not introduced to the network.

According to one embodiment of the present invention, the foregoing and other objects are attained in a communications system and method for reducing noise in a distributed antenna network. The system comprises a plurality of remote antenna units with each remote antenna unit including a receiver for receiving input signals, a signal strength processor for determining whether a valid signal is present at its respective remote antenna unit and an output controller for switching off the network connection when no valid signal is present. As a result, the cumulative noise generated by uplink stages connected to the remote antenna units is reduced by switching off the network connection of remote antennas that do not have to be connected.

According to another embodiment of the present invention, the foregoing and other objects are attained in a communications system and method for reducing noise in a distributed antenna network. The system comprises a plurality of remote antenna units with each remote antenna unit including a receiver for receiving input signals, and a signal strength processor for detecting and comparing the signal levels with a noise threshold level at its respective remote antenna unit. The system further comprises an output controller for controlling the network connection for its respective remote antenna unit based on the comparison by the signal strength processor. The output controller controls the network connection of the remote antennas by switching off their connection to the network when the signal strength processor determines that the signal level is below the noise threshold level. The output controller additionally controls the network connection of the remote antenna units by switching on the connection to the network for remote antenna units when the signal strength processor determines that the signal level is greater than or equal to the noise threshold level.

In the above-described system, the cumulative noise added by uplink stages in a distributed antenna network is greatly reduced without adversely affecting the communication capabilities of the system. Because each remote antenna unit in the distributed antenna network contributes to the cumulative noise when its output is connected to the network, whether or not the remote antenna unit has a valid signal, the performance of the system may be unnecessarily degraded when the output of remote antenna units that do not have valid signals present are connected to the network. The system and method of the present invention reduce the cumulative noise by switching off the connection to the network of the remote antenna units that do not have a valid signal and do not have to be connected to the network for communication purposes. Thereby, connections to the network are switched on only for remote antenna units that have valid signals present and are necessary to be connected to the network for communication purposes.

BRIEF DESCRIPTION OF THE DRAWINGS

The invention will be more fully understood by reading this description in conjunction with the accompanying drawings, which are given by way of illustration only, and thus are not limitative of the present invention, wherein:

FIG. 4 is a block diagram showing a system infrastructure in which a reduced noise system according to an embodiment of the present invention is implemented.

DETAILED DESCRIPTION

This invention is directed to a system and method which reduces the cumulative noise generated by uplink stages connected to a plurality of remote antenna units in a distributed antenna network. In these systems, it is essential to reduce the noise contribution of each remote antenna unit to avoid increasing the cumulative noise to such a point that performance is severely degraded as more remote antenna units are added to the network for increasing the coverage area. Because noise is contributed to the network by each of the remote antenna units being simply connected to the network, even when no signals are present, the cumulative noise may be reduced by connecting only those remote antenna units that are necessary for communication purposes, i.e., remote antenna units having valid signals present. A signal strength processor detects the signal strength level and determines whether a valid signal is present at each of the remote antenna units in the network and then switches off the network output at its respective remote antenna unit when no valid signal is present. Accordingly, the cumulative noise generated in the uplink stages of the network is reduced because only the remote antenna units receiving or transmitting valid signals are connected to the network. The cumulative noise reduction system and method according to this invention are based upon this principle.

Figure 1:
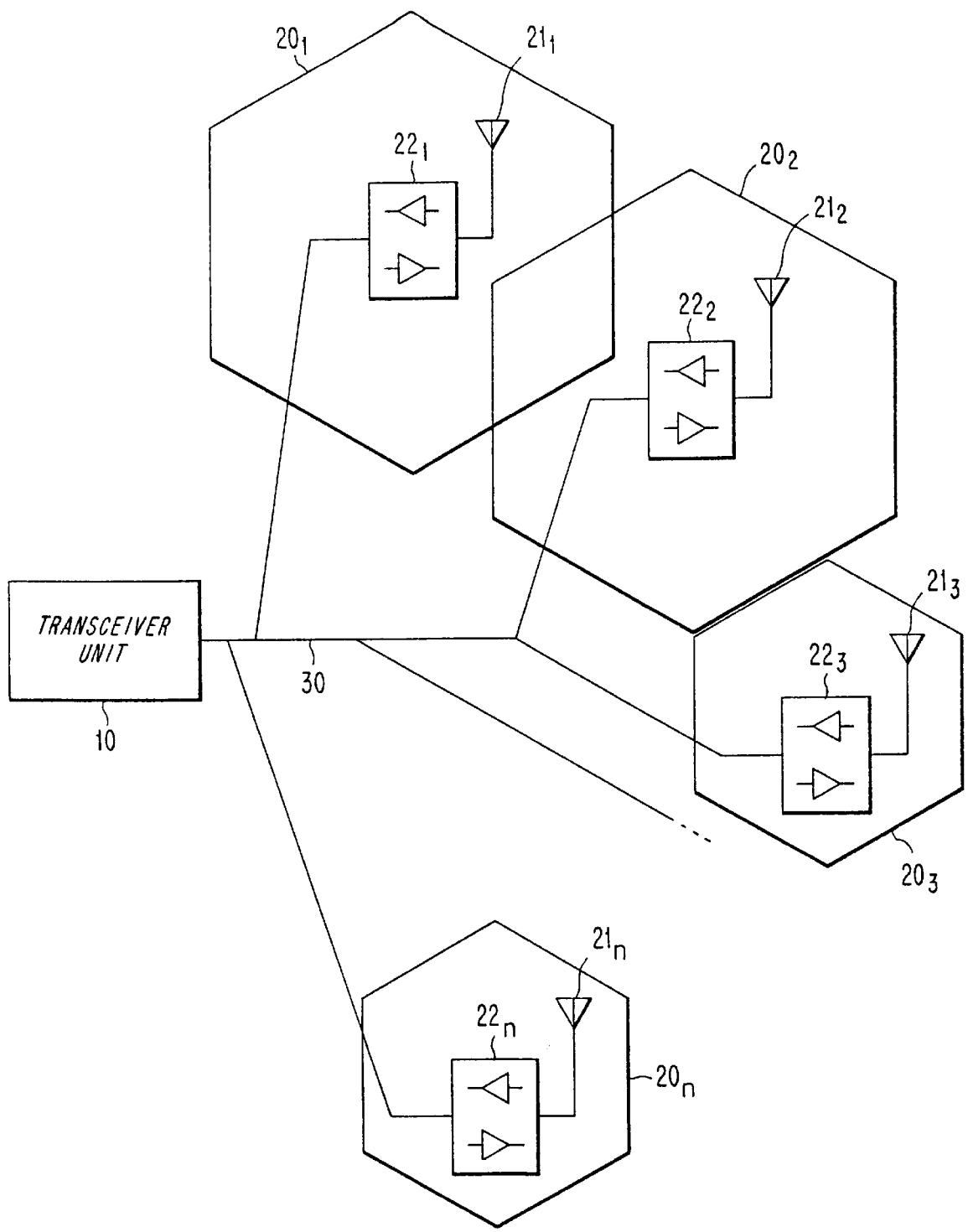
FIG. 1 illustrates a conventional distributed antenna network.
Figure 2:
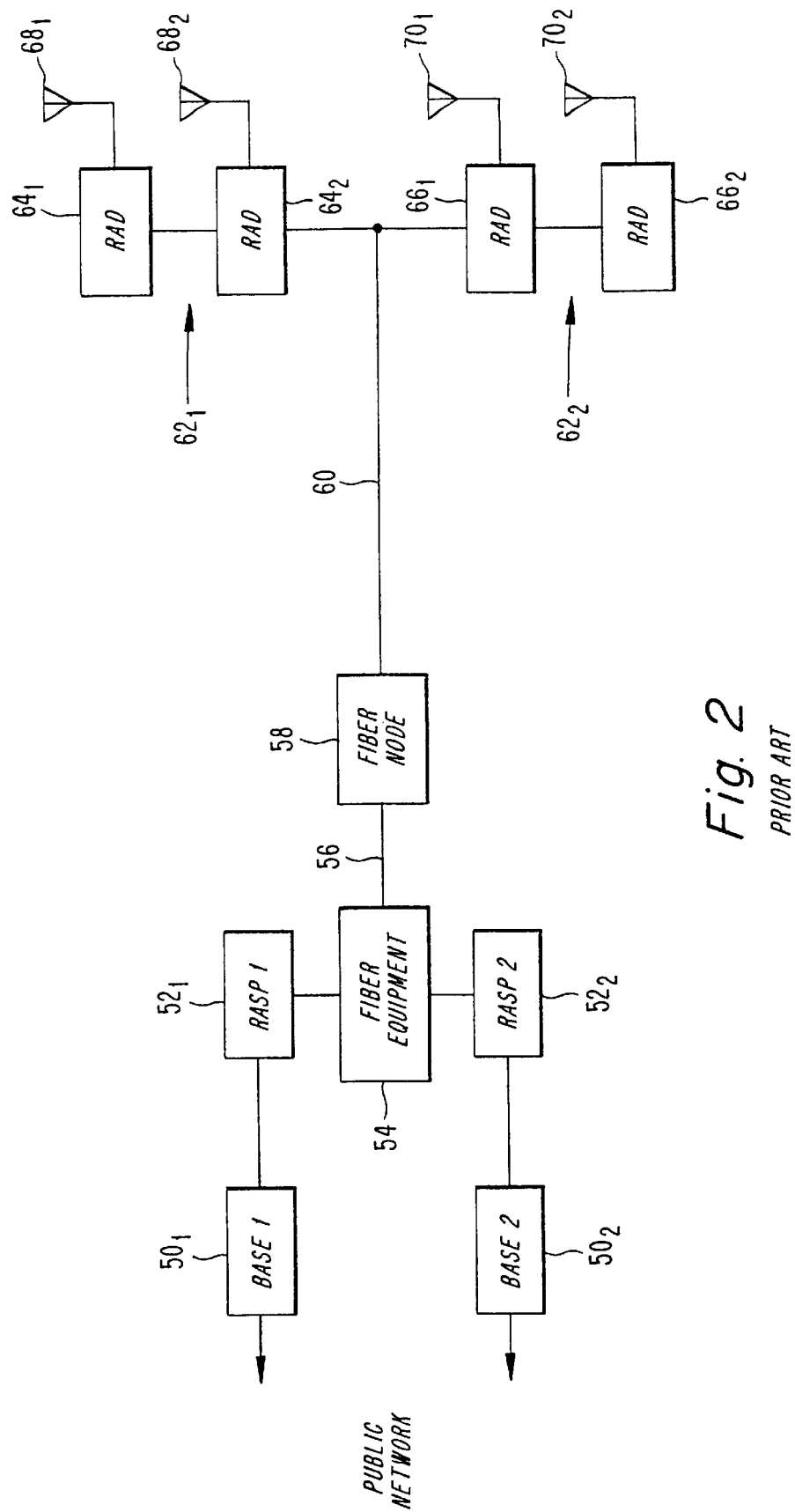
FIG. 2 is a block diagram of a known CATV infrastructure which supports PCS.
Figure 3A:
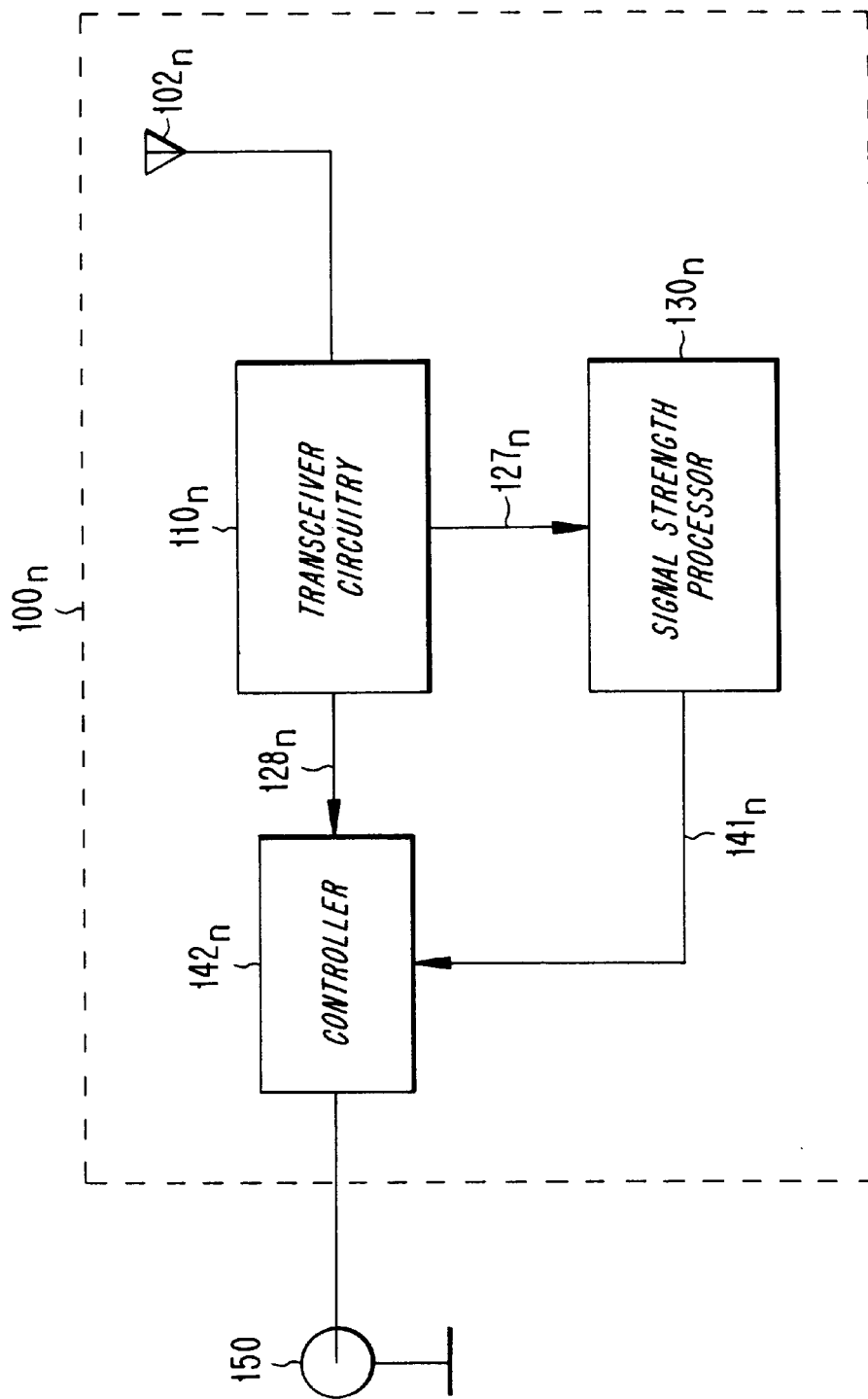
FIGS. 3(a) and 3(b) are block diagrams showing embodiments of the system for reducing noise in a distributed antenna network according to the present invention.

FIG. 3(a) illustrates one example of a system that is used in each remote antenna unit for reducing noise in a distributed antenna network according to the present invention. In this system, a plurality of remote antenna units $100_n$ are connected to the network 150 but only a representative remote antenna unit $100_n$ is shown in FIG. 3(a). An antenna $102_n$ provides an RF input signal to transceiver circuitry $110_n$ in this system. The transceiver circuitry $110_n$ is connected to a signal strength processor $130_n$ which controls the connection between the antenna $102_n$ and the network 150.

The signal strength processor $130_n$ determines whether a valid signal is present at the remote antenna $102_n$. If a valid signal is present, the antenna $102_n$ is connected to the network 150 by an output controller $142_n$. If a valid signal is not present, the output controller $142_n$ does not connect the antenna $102_n$ to the network 150.

The signal strength processor $130_n$ determines whether a valid signal is present at the antenna $102_n$ by analyzing the signal strength level. The signal strength processor $130_n$ measures the signal strength level at the antenna $102_n$ and compares this measured level with a noise threshold level. If the measured signal strength level is greater than or equal to the noise threshold level, the processor $130_n$ determines that a valid signal is present at the antenna $102_n$; if the measured signal strength level is below the noise threshold level, a valid signal is considered not to be present at the antenna $102_n$.

Figure 3B:
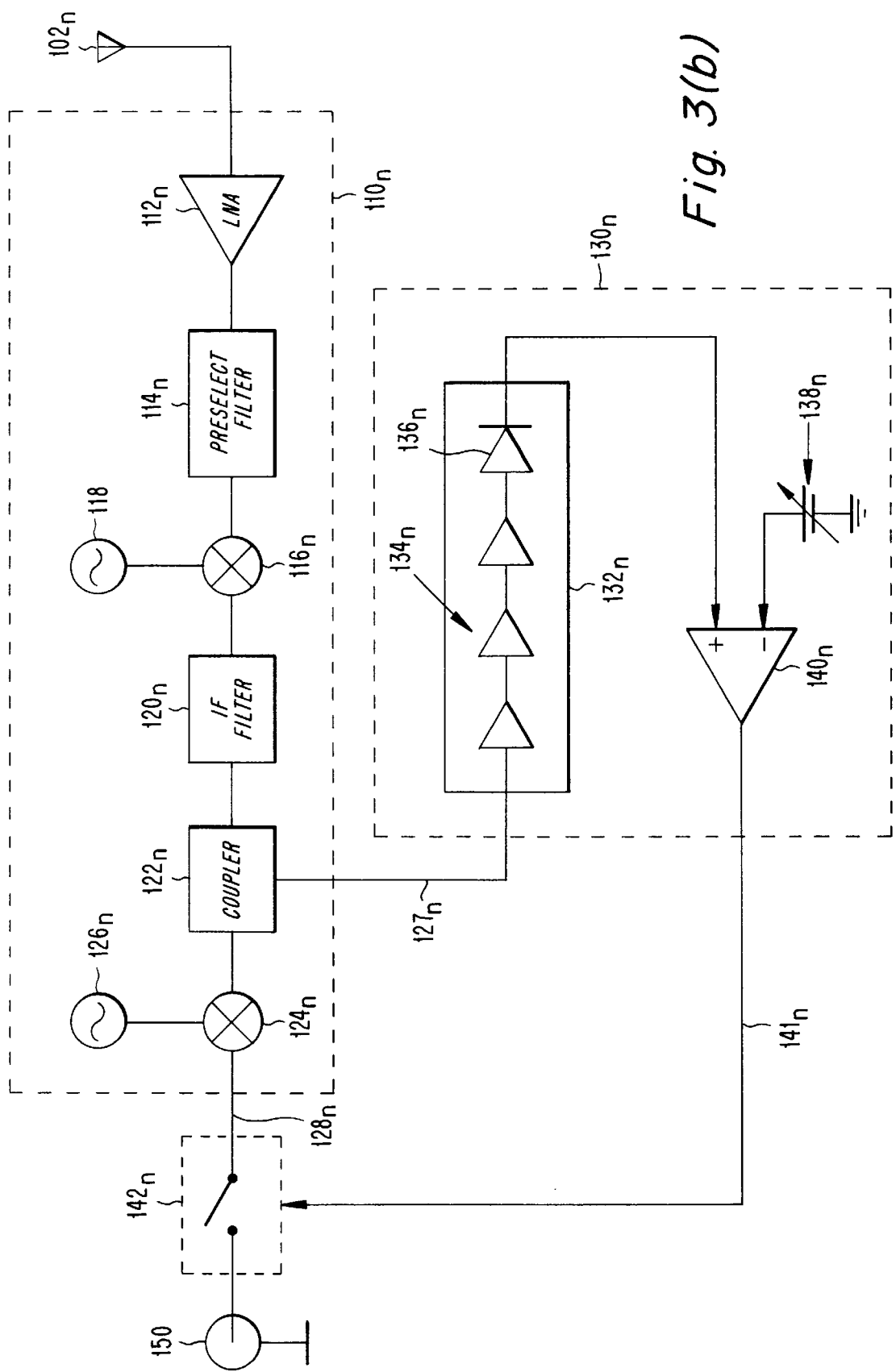

FIG. 3(b) illustrates the components of FIG. 3(a) in more detail. The transceiver circuitry $110_n$ includes a low noise amplifier $112_n$ connected to the antenna $102_n$ for amplifying RF signals gathered by the antenna $102_n$. The amplified signal is further processed by a preselecting filter $114_n$, a mixer $116_n$ connected to a first local oscillator $118_n$, and an intermediate frequency filter $120_n$. A standard coupler $122_n$ sends this processed signal from the intermediate frequency filter $120_n$ to the signal strength processor $130_n$ and also to a mixer $124_n$. The mixer $124_n$ is connected to a second local oscillator $126_n$ and outputs signal $128_n$ to the output controller $142_n$.

The signal strength processor $130_n$ includes a signal strength detector $132_n$ for receiving an output signal $127_n$ from the coupler $122_n$. The signal strength detector $132_n$ preferably includes a plurality of log amplifiers $134_n$ which are connected to a rectifier $136_n$. Although the log amplifiers $134_n$ are not necessary for enabling the signal strength to be detected, they are used to provide calibration in dB instead of linear calibration. In detecting the signal strength level, the signal strength detector $132_n$ amplifies the signal level to compensate for the loss, typically on the order of 10 dB, due to the coupler $122_n$. A conventional integrated circuit chip, such as Phillips NE/SA625 and SA626 ICs, may perform these signal strength detection functions.

The signal strength detected by the signal strength detector $132_n$ is input to a comparator $140_n$ which compares this detected signal strength level with a noise threshold level. The noise threshold level is generated by a threshold reference generator $138_n$ and may be variably set. A comparison signal $141_n$ from the comparator $140_n$ is then used to control the connection of the processed signal from the antenna $102_n$ to the network 150. More specifically, a signal $128_n$ output from the transceiver circuitry $110_n$ for the antenna $102_n$ is only connected to the network 150 when the comparator $140_n$ determines that the detected signal strength level is greater than or equal to the noise threshold level. Thereby, the comparison signal $141_n$ causes the output controller $142_n$ to connect the processed signal $128_n$ to the network 150. The output controller $142_n$ may be an electrical switch, such as a transistor, controlled by the comparison signal $141_n$.

To determine whether a valid signal is present at the remote antenna units, the noise threshold level used for the comparison with the detected signal strength level should preferably be set slightly above the noise floor of the uplink prior to the connection of the transmission network. The noise threshold level may be set with a digital potentiometer or the like so that remote adjustments may be performed. Referring to FIG. 3(b), the threshold reference generator $138_n$ may be variably adjusted to achieve the optimum noise threshold level setting at slightly above the noise floor. This noise level setting may be factory set in the remote antenna units by measuring the output signal $128_n$ without an RF signal being input (the noise present without a transmitting carrier). The noise floor is measured so that the noise threshold level may be monitored. If a remote antenna unit is being switched on or off improperly, a central unit for controlling the entire system may be used by a system operator to adjust the noise threshold level or the adjustment may be performed manually at the remote antenna unit.

The signal strength detector $132_n$ and the output controller $142_n$ should be fast enough to track fades and the ramp up time of individual bursts (in the case of TDMA) so as not to distort the data. The bandwidth for measuring the signal strength should preferably be narrower than the channel bandwidth or otherwise compensated to maximize the sensitivity of the measure branch. In other words, an optimum point exists such that the bandwidth of the measuring device is narrower than the channel bandwidth but allows a response time fast enough to track the fades and the burst ramps. In order to minimize false switching, hysteresis may be used at the optimum point. More specifically, a voltage range is utilized about the optimum point such that the remote antenna unit is always on when the detected level is above the voltage range and is always off when the detected level is below the voltage range. The hysteretic effect is provided when the detected level is within the voltage range. If the voltage range is reached when the remote antenna unit is on, the remote antenna unit will not be switched off until the minimum level of the voltage range is reached. Similarly, if the voltage range is reached when the remote antenna unit is off, the remote antenna unit will not be switched on until the maximum level of the voltage range is reached.

FIG. 4 illustrates an example of a CATV system infrastructure that may advantageously utilize Applicants' system and method for reducing noise. The infrastructure includes fiber nodes $200_1, \ldots 200_n$ which are connected to a CATV headend 300 by respective optical fibers $250_1, \ldots 250_n$. The CATV headend 300 may support a number of fiber nodes $200_1, \ldots 200_n$, each of which may generally support approximately 500 to 1500 homes or subscribers through a plurality of remote antenna units $202_1, \ldots 202_n$. The remote antenna units $202_1, \ldots 202_n$ are respectively connected by the optical fibers $250_1, \ldots 250_n$ to the CATV headend 300. Also, a plurality of the remote antenna units $202_1, \ldots 202_n$ are connected to an amplifying and optical/electrical converting circuit $206_n$ by coaxial cabling $204_n$.

The CATV headend 300 includes an amplifying and electrical/optical converting circuit 302 which is used for interfacing the CATV headend 300 to the optical fibers $250_1, \ldots 250_n$. The amplifying and electrical/optical converting circuit 302 is connected to combining and splitting circuitry 304 which is connected to a video source 306 and cable access processing (CAP) units $308_1, \ldots 308_n$ which at least correspond in number to the fiber nodes $200_1, \ldots 200_n$ of the system. The CAP units $308_1, \ldots 308_n$ are connected to radio base stations (RBS) $314_1, \ldots 314_n$ and a hub 310. The hub 310 is further connected to a remote antenna management system (RAMS) 312. The CAP units $308_1, \ldots 308_n$ are also connected to an operation support system/switching center (OSS/SC) 350. The OSS/SC 350 includes a mobile switching center 352, a base station controller 354, an operation support system 356 and its own RAMS 358. The RAMS 358 of the OSS/SC 350 may communicate with the RAMS 312 of the CATV headend 300 so that a plurality of CATV headends may be controlled at a central location. The base station controller 354 is also connected to a macro cell 360 which includes a RBS 362. The CAP units $308_1, \ldots 308_n$ provide the frequency conversion and power level adjustments for placing telephony carrier signals on the CATV infrastructure as well as controlling and monitoring the status of the remote antenna units $202_1, \ldots 202_n$.

The remote antenna units $202_1, \ldots 202_n$ are located in desired areas and convert the CATV base communication signals back to their proper air frequencies and power levels. Each of the remote antenna units $202_1, \ldots 202_n$ is associated with a specific transceiver radio unit (TRU) in the RBS $314_1, \ldots 314_n$ so that the CATV network is totally transparent to the radio operation. The operating frequency of the CAP units $308_1, \ldots 308_n$ is set to exactly match the frequency of the remote antenna transmitter. Up to six TRUs in a specific one of the RBS $314_n$ feed one of the CAP units $308_1, \ldots 308_n$ which in turn serves several fiber nodes $200_1, \ldots 200_n$ in the CATV network. A combiner within the CAP units $308_1, \ldots 308_n$ provide six transmit input ports from the RBS $314_1, \ldots 314_n$ in order to support a maximum of six TRUs. The CAP units $308_1, \ldots 308_n$ convert the telephony carrier signals to CATV frequency signals and feed them to the CATV headend 300 over a bidirectional coaxial cable.

In the CATV headend 300, the telephony carrier signals are combined with the video signals and both signals are transmitted over the fiber optic cables $250_1, \ldots 250_n$ to fiber nodes $200_1, \ldots 200_n$. At the fiber nodes $200_1, \ldots 200_n$ the signals are converted back to electrical signals and distributed over a tree and branch coaxial network. Each individual one of the remote antenna $202_1, \ldots 202_n$ taps off the coaxial cabling 204, filters the carrier signals, converts the frequency and transmits the carrier signals over the air interface. The video signals continue unaltered to each CATV subscriber. For the uplink, the remote antenna units $202_1, \ldots 202_n$ receive two diversity signals from the air, down convert each to a different frequency, and transmit the diversity carrier signals over the CATV infrastructure. In the CATV infrastructure at the fiber nodes $200_1, \ldots 200_n$, the electrical signals are converted to optical signals and transmitted back to the CATV headend 300. These signals are then converted back to electrical signals and routed to the CAP units $308_1, \ldots 308_n$ over the bidirectional cable. The CAP units $308_1, \ldots 308_n$ convert the uplink carrier signals back up to frequencies for the input to the TRUs. The CAP units $308_1, \ldots 308_n$ receive digital control information from the RAMS 312 and forward remote antenna control information to the desired one of the remote antenna units $202_1, \ldots 202_n$.

Because each one of the remote antenna units covers a small area, multicasting provides a more efficient use of radio resources to cover larger areas. The number of remote antenna units in a multicast group is limited by the addition of receiver thermal noise resulting from each remote antenna unit in the uplink. By the signal strength detection system and method of this invention, the number of remote antenna units that are used in a multicast group may be increased because the cumulative noise resulting from the uplink stages is reduced. For example, if 50 remote antenna units are included in a multicast group, but only two remote antenna units are receiving valid signals, the 48 remote antenna units that are not receiving a valid signal may be shut off from the network connection and the cumulative noise introduced to the network by these remote antenna units is eliminated. Therefore, the only noise contribution in this case is from the two remote antenna units that have a valid signal and the cumulative noise is significantly reduced.

The invention being thus described, it will be obvious that the same may be varied in many ways. Such variations are not to be regarded as a departure from the scope of the invention, which is determined by the following claims. All such modification that would be obvious to one skilled in the art are intended to be included within the scope of the following claims.

What is claimed is:

1. A communication system for reducing noise in a distributed antenna network, comprising:

a plurality of remote antenna units, each of said remote antenna units including,
  a receiver for receiving input signals,
  a signal strength processor for detecting levels of said input signals for said remote antenna unit and comparing the levels of said input signals with first and second noise threshold levels, and
  an output controller for switching off a network connection for said remote antenna unit when said signal strength processor determines that the levels of said input signals are less than the first noise threshold level and switching on the network connection for said remote antenna unit when said signal strength processor determines that the levels of said input signals are greater than or equal to the second noise threshold level, wherein the second noise threshold level is greater than the first noise threshold level, and wherein a) when the levels of the input signals are between the first and second noise threshold levels and the network connection for the remote antenna unit is off, and then the levels of the input signals meet the second noise threshold level, the output controller switches on the network connection for the remote antenna unit; and b) when the levels of the input signals are between the first and second noise threshold levels and the network connection for the remote antenna unit is on, and then the levels of the input signals cross the first noise threshold level, the output controller switches off the network connection for the remote antenna unit; and a central unit for remotely adjusting the first and second noise threshold levels for each remote antenna unit.

2. A communication system according to claim 1, wherein at least one of the first and second noise threshold levels is set slightly greater than the noise floor of the uplink for the remote antenna units.

3. A communication system according to claim 1, wherein said signal strength processor comprises:

a signal strength detector for detecting the level of said input signals;

a threshold reference generator for variably setting the first and second noise threshold levels, wherein the central Unit remotely controls the threshold reference generator; and a comparator for comparing the levels of said input signals with the first and second noise threshold levels.

4. A communication system for reducing cumulative noise in the uplink stages of a distributed antenna network, comprising:

transceivers for sending and receiving information;

a plurality of remote antenna units operatively communicative with said transceiver, each of said remote antenna units including,
  a receiver for receiving input signals,
  a signal strength processor for detecting levels of said input signals for said remote antenna unit and comparing the levels of said input signals with first and second noise threshold levels, and
  an output controller for switching the output of said remote antenna unit on and off in response to the comparison by said signal strength processor; and a central unit for remotely adjusting the first and second noise threshold levels for each remote antenna unit, wherein said output controller switches on the connection between the network and said remote antenna unit when said signal strength processor determines that the levels of said input signal are greater than or equal to the second noise threshold level and said output controller switches off the connection between the network and said remote antenna unit off when said signal strength processor determines that the levels of said input signal are less than the first noise threshold level, wherein the second noise threshold level is greater than the first noise threshold level, and wherein a) when the levels of the input signals are between the first and second noise threshold levels and the network connection between the network and the remote antenna unit is off, and then the levels of the input signals meet the second noise threshold level, the output controller switches on the network connection between the network and the remote antenna unit; and b) when the levels of the input signals are between the first and second noise threshold levels and the network connection between the network and the remote antenna unit is on, and then the levels of the input signals cross the first noise threshold level, the output controller switches off the network connection between the network and the remote antenna unit.

5. A communication system according to claim 4, wherein said receiver in each of said remote antenna units comprises:
   an antenna for receiving an RF input signal;
   a low noise amplifier and a preselecting filter for amplifying and filtering said RF input signal;
   a first local oscillator, a first mixer and an intermediate filter for processing the filtered RF input signal; and
   a second local oscillator and a second mixer for further processing the signal output from said intermediate filter.

6. A communication system according to claim 4, wherein said signal strength processor comprises:
   a signal strength detector for detecting the levels of said input signals;
   a threshold reference generator for variably setting the first and second noise threshold levels, wherein the central unit remotely controls the threshold reference generator; and
   a comparator for comparing the levels of said input signals with the first and second noise threshold levels.

7. A communication system according to claim 6, wherein said signal strength detector comprises a predetermined number of logarithmic amplifiers and a rectifier.

8. A communication system according to claim 4, wherein said output controller comprises a switch for controlling the connection between the output of said remote antenna unit and the network.

9. A communication system according to claim 4, wherein said transceivers are connected to said remote antenna units by an analog transmission media which transports radio signals therebetween.

10. A communication system according to claim 4, wherein at least one of the first and second noise threshold levels is set to be slightly above the noise floor of the uplink for each of said remote antenna units and the network.

11. A communication system for reducing noise in a distributed antenna network, comprising:
   a plurality of remote antenna units, each of said remote antenna units including,
      a receiver for receiving input signals,
      a signal strength processor for detecting levels of said input signals for said remote antenna unit and comparing the levels of said input signals with first and second noise threshold levels, and
      an output controller for switching the output of said remote antenna unit on and off in response to the comparison by said signal strength processor; and
   a central unit for remotely adjusting the parameters for each of the plurality of remote antenna units, wherein said output controller switches on the connection between the network and said remote antenna unit when said signal strength processor determines that the levels of said input signal are greater than or equal to the second noise threshold level and said output controller switches off the connection between the network and said remote antenna unit off when said signal strength processor determines that the levels of said input signal are less than the first noise threshold level, wherein the second noise threshold level is greater than the first noise threshold level, and wherein a) when the levels of the input signals are between the first and second noise threshold levels and the network connection between the network and the remote antenna unit is off, and then the levels of the input signals meet the second noise threshold level, the output controller switches on the network connection between the network and the remote antenna unit; and b) when the levels of the input signals are between the first and second noise threshold levels and the network connection between the network and the remote antenna unit is on, and then the levels of the input signals cross the first noise threshold level, the output controller switches off the network connection between the network and the remote antenna unit.

12. A method for reducing noise in a distributed antenna network of a communication system comprising the steps of:
   (a) receiving input signals by a plurality of remote antenna units;
   (b) detecting levels of said input signals and comparing the levels of said input signals with first and second noise threshold levels, wherein the second noise threshold level is greater than the first noise threshold level; and
   (c) switching off the connection between the network and said remote antenna units when said step (b) determines that said input signals are less than first noise threshold level and switching on the connection between the network and said remote antenna units when said step (b) determines that said input signals are greater than or equal to the second noise threshold level.

13. A method according to claim 12, wherein at least one of the first and second noise threshold levels is set slightly greater than the noise floor of the uplink for the remote antenna units.

14. A method according to claim 12, wherein said step (b) further comprises the steps of:
   (b)(1) detecting the level of said input signals;
   (b)(2) remotely adjusting the first and second noise threshold levels; and
   (b)(3) comparing the level of said input signal with the first and second noise threshold levels.

15. A method for reducing cumulative noise in the uplink stages of a distributed antenna network of a communication system, comprising the steps of:
   (a) sending and receiving information;
   (b) receiving input signals sent at said step (a) by a plurality of remote antenna units;
   (c) detecting the level of said input signals and comparing the level of said input signals with first and second noise threshold levels, wherein the second noise threshold level is greater than the first noise threshold level; and
   (d) switching the connection between the network and said remote antenna units on and off in response to the comparison of step (c) by connecting the network and said remote antenna unit when said step (c) determines that the level of said input signal is greater than or equal to the second noise threshold level, and disconnecting the network and said remote antenna unit when said step (c) determines that the level of said input signal is less than the first noise threshold level.

16. A method according to claim 15, wherein said step (c) further comprises the steps of:
   (c)(1) detecting the level of said input signals;
   (c)(2) remotely adjusting the first and second noise threshold levels; and (c)(3) comparing the level of said input signal with the first and second noise threshold levels.

17. A method according to claim 15, wherein at least one of the first and second noise threshold levels is set to be slightly above the noise floor of the uplink stage at the output for each of said remote antenna units and the network.

18. A method for reducing noise in a distributed antenna network of a communication system, comprising the steps of:

(a) receiving input signals by a plurality of remote antenna units;

(b) determining whether or not a valid signal is present at each of the plurality of remote antenna units based on first and second noise threshold levels for each of the plurality of remote antenna units, wherein the second noise threshold level is greater than the first noise threshold level, a valid signal is not present at the remote antenna unit when the level of the input signal is less than the first noise threshold level for the remote antenna unit, and a valid signal is present at the remote antenna unit when the level of the input signal is greater than or equal to the second noise threshold level for the remote antenna unit;

(c) disconnecting each remote antenna unit from the network when said signal strength processor determines that a valid signal is not present at the remote antenna unit, and connecting the network and each remote antenna unit when the signal strength processor determines that a valid signal is present at the remote antenna unit; and (d) remotely adjusting the first and second noise threshold levels for each of the plurality of remote antenna units.

* * * * *

UNITED STATES PATENT AND TRADEMARK OFFICE
CERTIFICATE OF CORRECTION

PATENT NO. : 6,128,470
DATED : October 3, 2000
INVENTOR(S) : Arun Naidu, et al.

It is certified that error appears in the above-identified patent and that said Letters Patent is hereby corrected as shown below:

On the cover sheet in the "Inventors:" field, change "Raleigh" to - -Woodinville, W.A.- -

On the cover sheet in the "Inventors:" field, change "Cary" to - -Cary, N.C.- -

On the cover sheet in the "Inventors:" field, Change "Apex" to - -Cary, N.C.- -

On the cover sheet in the "Inventors:" field, delete "all of N.C."

In column 2, at line 21, change "heliaxial" to - -heliax- -

In column 2, at line 47, change "is to" to - -to- -

In column 3, at line 54, change "filly" to - -fully- -.

Signed and Sealed this

Fifteenth Day of May, 2001

*Attest:*

NICHOLAS P. GODICI

*Attesting Officer*    *Acting Director of the United States Patent and Trademark Office*